(12) United States Patent
Conte et al.

(10) Patent No.: US 7,668,686 B2
(45) Date of Patent: Feb. 23, 2010

(54) EXTERNAL TEMPERATURE DISPLAY CONTROL ALGORITHM

(75) Inventors: Joshua Conte, White Lake, MI (US); Akira Oga, West Bloomfield, MI (US); Robert Wunsche, Clarkston, MI (US)

(73) Assignee: DENSO International America, Inc., Southfield, MI (US)

( * ) Notice: Subject to any disclaimer, the term of this patent is extended or adjusted under 35 U.S.C. 154(b) by 103 days.

(21) Appl. No.: 11/703,808

(22) Filed: Feb. 7, 2007

(65) Prior Publication Data

US 2008/0189070 A1    Aug. 7, 2008

(51) Int. Cl.
*G06F 15/00* (2006.01)

(52) U.S. Cl. .................. 702/130; 374/133; 374/137; 340/449; 340/588

(58) Field of Classification Search .................. 703/130, 703/99; 702/130, 99; 374/142, 145, 144, 374/133, 137; 340/449, 588; 701/1; 700/306
See application file for complete search history.

(56) References Cited

U.S. PATENT DOCUMENTS 5,416,728 A * 5/1995 Rudzewicz et al. ......... 702/130
6,665,629 B2 * 12/2003 Manakkal et al. ........... 702/130

* cited by examiner

*Primary Examiner*—Drew A Dunn
*Assistant Examiner*—Hien X Vo
(74) *Attorney, Agent, or Firm*—Harness, Dickey & Pierce, PLC

(57) ABSTRACT

A method of controlling an initial external temperature display in a vehicle may include comparing an ignition-off time with a first threshold and displaying a current reading from an outside ambient temperature sensor when the ignition-off time equals or exceeds the first threshold. The method further includes comparing at least one secondary condition with at least one secondary parameter when the ignition-off time falls below the first threshold and selecting and displaying a reading based on the comparison of the at least one secondary condition with the at least one secondary parameter. This comparison can include comparing a previous ignition-on time with a second threshold and comparing a sum of the ignition-off time and a stored amount with a third threshold when the previous ignition-on time equals or falls below the second threshold. Alternatively, this comparison can include comparing an engine water temperature with a temperature threshold.

17 Claims, 3 Drawing Sheets

EXTERNAL TEMPERATURE DISPLAY CONTROL ALGORITHM

FIELD

The present disclosure relates to controlling an external temperature display in a vehicle.

BACKGROUND

The statements in this section merely provide background information related to the present disclosure and may not constitute prior art. Many vehicles include an external temperature display so that vehicle passengers may be apprised of the ambient temperature outside of the vehicle. Temperature sensors providing temperature readings for the displays are conventionally located proximate vehicle engines within vehicle engine compartments. Temperature sensors may operate accurately during vehicle use as engine cooling processes, such as airflow through the engine compartment, for example, normally prevent engine heat from interfering with the temperature sensors. However, when a significant amount of engine heat is present at ignition, the engine heat may interfere with the initial accuracy of the temperature sensors, and hence the internal display of such temperatures to vehicle passengers.

Currently, to avoid an inaccurate initial display due to engine heat present at engine ignition, the amount of time that a vehicle has been off is considered. For example, if a vehicle engine has been off for a relatively long time, the engine should be cool enough, such as at the ambient air temperature for example, so as not to interfere with a temperature sensor at ignition, and an initial reading of the temperature sensor is displayed. Otherwise, such as for short engine off periods, a previous reading of the temperature sensor is displayed.

However, such an approach does not account for instances in which a vehicle is on for only a relatively short amount of time. When a vehicle is on for only a short amount of time, the engine may not become heated enough to interfere with the temperature sensor at the following ignition. Therefore, consideration of only the amount of time the vehicle has been off can prevent the display of an updated and accurate external temperature reading from the temperature sensor in instances such as when the vehicle was previously on for only a relatively short amount of time.

Accordingly, it is desirable to control an external temperature display within a vehicle such that with consideration of any heat effects of an engine, and time, an accurate external temperature reading is displayed.

SUMMARY

The present disclosure provides a method of controlling an initial external temperature display in a vehicle. The method includes comparing an ignition-off time with a first time threshold and displaying a current temperature reading from an outside ambient temperature sensor of the vehicle when the ignition-off time equals or exceeds the first time threshold. The method further includes comparing at least one secondary condition with at least one secondary control parameter when the ignition-off time becomes less than the first time threshold and selecting and displaying a temperature reading based on the comparison of the at least one secondary condition with the at least one secondary control parameter. The comparison of the at least one secondary condition with the at least one secondary control parameter may include comparing a previous ignition-on time with a second time threshold and comparing a sum of the ignition-off time and a stored time amount with a third time threshold when the previous ignition-on time equals or becomes less than the second time threshold. Alternatively, the comparison of the at least one secondary condition with the at least one secondary control parameter may include comparing an engine water temperature with a temperature threshold.

Further areas of applicability of the teachings of the present disclosure will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
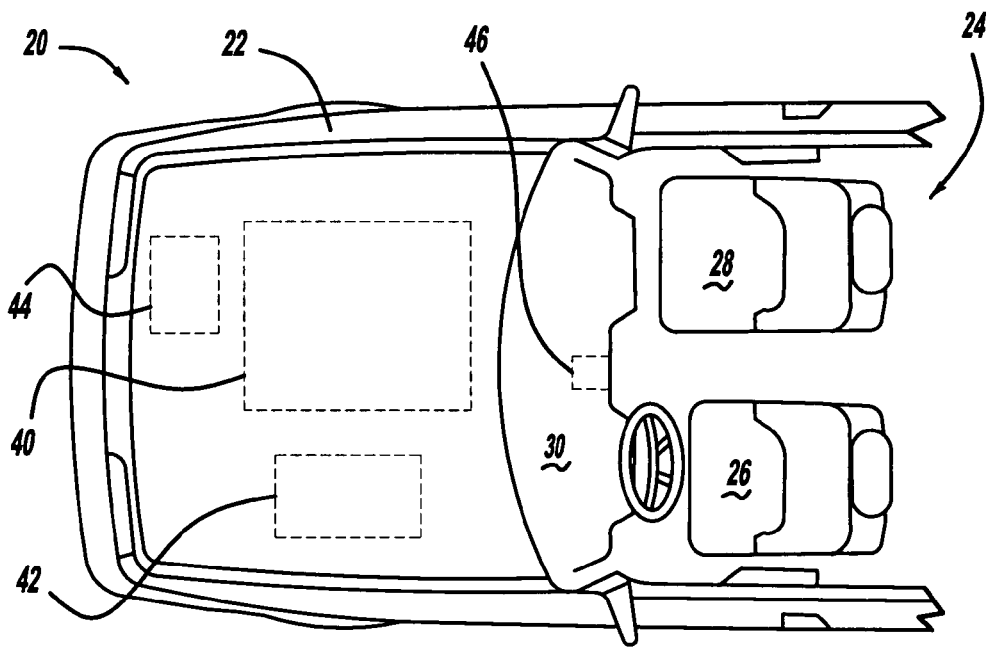
FIG. 1 is a plan view depicting a portion an exemplary vehicle according to the present disclosure.

The following description is merely exemplary in nature and is not intended to limit the present disclosure, application, or uses. It should be understood that throughout the drawings, corresponding reference numerals indicate like or corresponding parts and features. For example, the reference numerals 15 and 15' can indicate like or corresponding parts and features.

Figure 2:
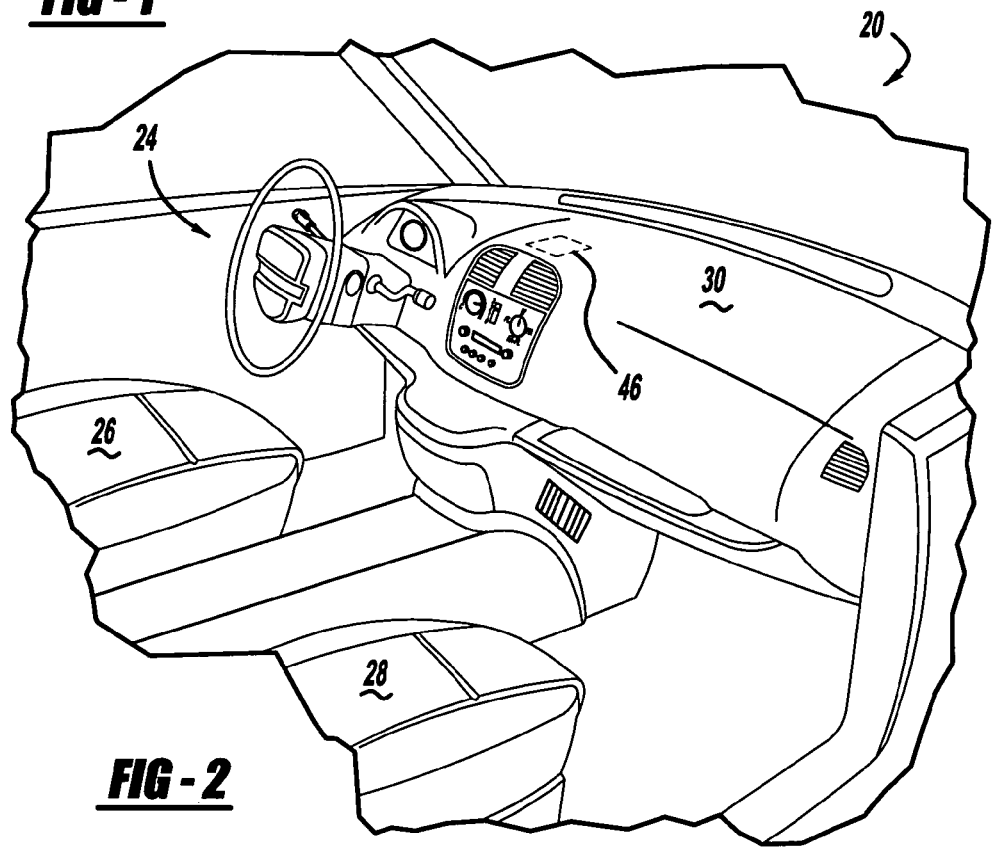
FIG. 2 is a perspective view depicting a portion of an interior of an exemplary vehicle according to the present disclosure.

Referring to FIGS. 1 and 2, according to the principles of the present disclosure, a portion of an exemplary vehicle 20, such as an automobile, is depicted; however, it should be understood that the principles of the present disclosure can be used with a variety of vehicles.

The vehicle 20 includes a body 22 and an interior cabin 24. A pair of passenger seats 26, 28 is disposed within the cabin 24, and an instrument panel 30 is located in front of the passenger seats 26, 28 within the cabin 24. Forward of the cabin 24, the body 22 supports an engine 40, an engine control system 42, and an outside ambient temperature sensor 44. Additionally, a display module 46 is supported within the instrument panel 30 and is operable to display a temperature reading from the temperature sensor 44.

Figure 3:
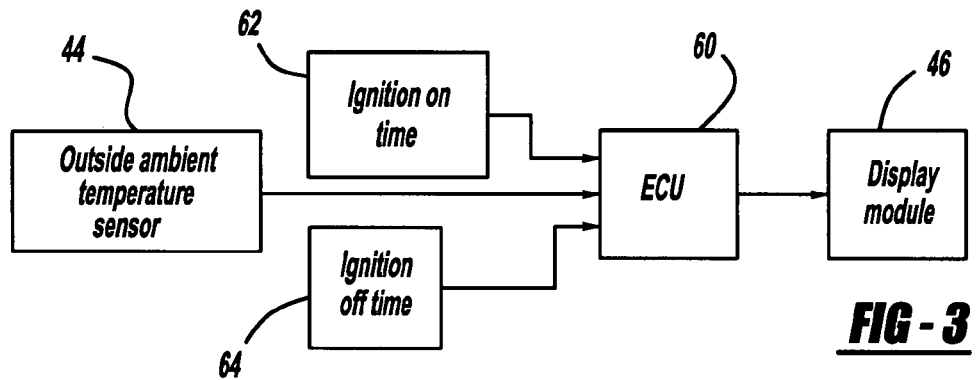
FIG. 3 is a diagram depicting an exemplary external temperature display system according to the present disclosure.

As is well-known in the art, the engine control system 42 can include a control unit 60 (FIG. 3). It should be understood that the engine control system 42 and control unit 60 are operable to receive, store, process, and transmit information as is well-known in the art. For example, engine control system 42 can include a variety of parts and/or features that are operable to monitor, transmit, and store a variety of engine information.

For example, referring to FIG. 3, a system for controlling an initial external temperature display of the vehicle 20 is schematically illustrated. The temperature sensor 44 communicates with the control unit 60, which in turn communicates with the display module 46. Furthermore, the control unit 60 receives information such as ignition-on time 62 and ignition-off time 64. In particular, the system according to the principles of the present disclosure can monitor and store at least a current ignition-off time (the amount of time vehicle 20 was off before the current ignition cycle), a previous ignition-on time (the amount of time of the previous ignition cycle), and a previous ignition-off time (the amount of time vehicle 20 was off before the previous ignition cycle).

One exemplary method of controlling an initial external temperature display according to the principles of the present disclosure includes consideration of the previous ignition-on time of the vehicle. In particular, when the vehicle has not been off long enough to ensure against engine heat interference with the temperature sensor at ignition, it is determined if the vehicle was previously on for a relatively short amount of time. If so, the previous ignition-off time is considered with the current ignition-off time. When these ignition-off times are long enough, and therefore, the vehicle engine should be cool enough, such as at or a few degrees from the ambient air temperature for example, so as to not interfere with the temperature sensor even with the short previous ignition cycle, the current temperature reading is displayed.

Figure 4:
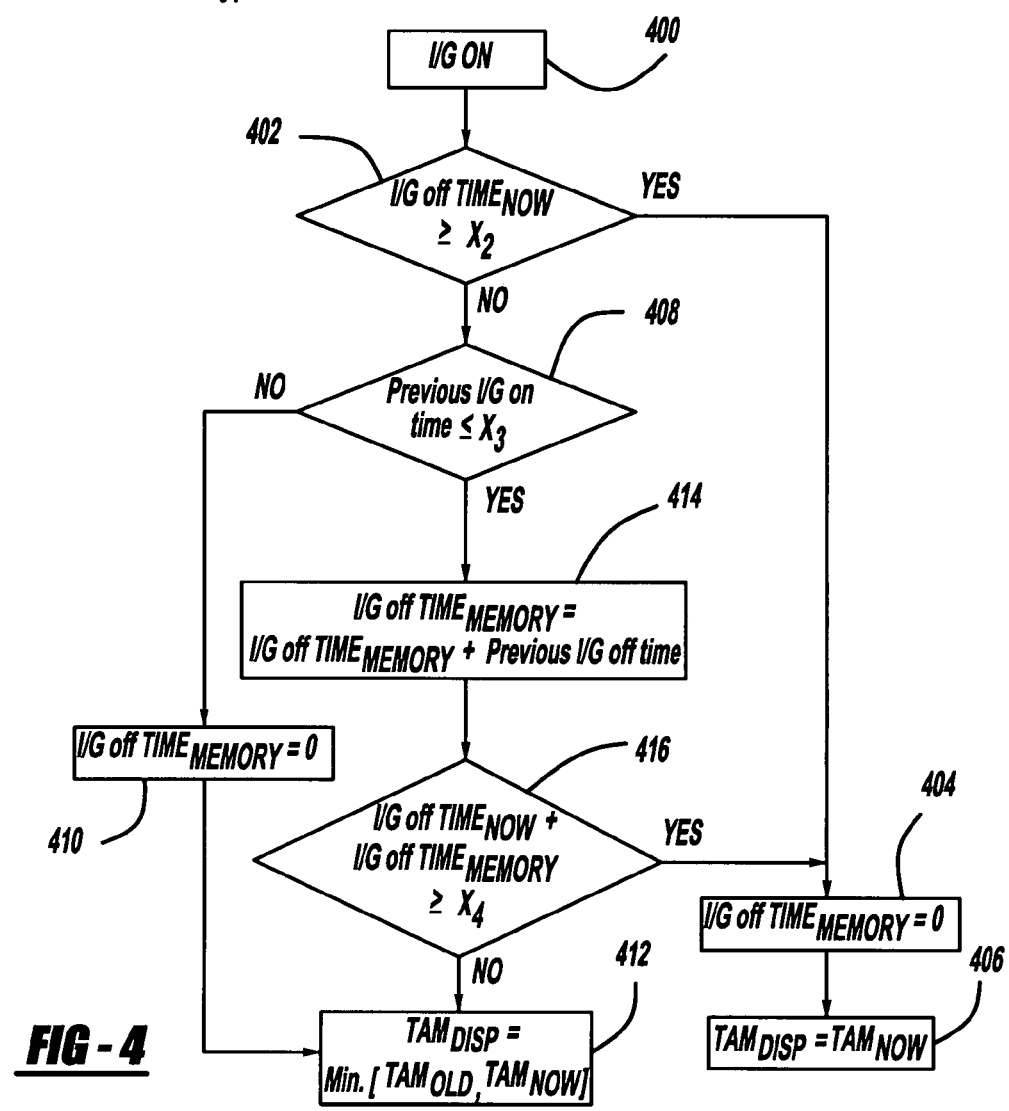
FIG. 4 is a flowchart depicting an exemplary method of controlling an initial external temperature display in a vehicle according to the present disclosure.

Referring to FIG. 4, a flowchart illustrates such an exemplary method of controlling an initial external temperature display in a vehicle in detail. As used in FIG. 4, "I/G" represents ignition of vehicle 20, "I/G off TIME$_{NOW}$" represents a current ignition-off time, and "I/G off TIME$_{MEMORY}$" represents a stored amount of time. Furthermore, as used in FIG. 4, "TAM$_{DISP}$" represents the temperature reading which will be displayed by display module 46, "TAM$_{NOW}$" represents the current temperature reading from temperature sensor 44, and "TAM$_{OLD}$" represents the temperature reading displayed at the end of the previous ignition cycle (the previously displayed temperature reading).

The method of controlling an initial external temperature display in a vehicle according to the principles of the present disclosure of FIG. 4 begins at box 400 when the ignition of vehicle 20 is turned on. Referring to decision box 402, first the current ignition-off time (I/G off TIME$_{NOW}$) is compared to a first time threshold $X_2$. By way of a non-limiting example, the first time threshold $X_2$ can be 60 minutes. When the current ignition-off time equals or exceeds the first time threshold $X_2$, the stored amount of time (I/G off TIME$_{MEMORY}$) is reset to zero (box 404), and the current temperature reading (TAM$_{NOW}$) is displayed (box 406). For example, with first time threshold $X_2$ at 60 minutes, if vehicle 20 was off for 60 minutes or more before the current ignition, the current temperature reading is displayed.

With continued reference to FIG. 4, when the current ignition-off time becomes less than first time threshold $X_2$, the previous ignition-on time is compared to a second time threshold $X_3$. By way of a non-limiting example, the second time threshold $X_3$ can be 1 minute. When the previous ignition-on time exceeds the second time threshold $X_3$, the stored amount of time (I/G off TIME$_{MEMORY}$) is reset to zero (box 410), and the minimum of the current temperature reading and the previously displayed temperature reading (TAM$_{OLD}$) is displayed (box 412). For example, with second time threshold $X_3$ at 1 minute, if vehicle 20 was previously on for more than 1 minute, there may be engine heat interference with the temperature sensor 44 at ignition.

With continued reference to FIG. 4, when the previous ignition-on time equals or becomes less than the second time threshold $X_3$, vehicle 20 was previously on for a relatively short amount of time, and, therefore, the engine 40 may be cool enough so as to not interfere with temperature sensor 44. Referring to box 414, the previous ignition-off time is added to the stored time amount. Next, at decision box 416, a sum of the current ignition-off time and the stored time amount is compared to a third time threshold $X_4$. By way of a non-limiting example, the third time threshold $X_4$ can be 60 minutes. When the sum equals or exceeds the third time threshold $X_4$, the stored amount of time is reset to zero (box 404), and the current temperature reading is displayed (box 406). For example, with third time threshold $X_4$ at 60 minutes, if vehicle 20 was off for at least 60 minutes notwithstanding the relatively short previous ignition cycle, then the engine 40 should be cool enough so as to not interfere with the temperature sensor 44 at ignition. Furthermore, when the sum falls below the third time threshold $X_4$ (box 416), the minimum of the current temperature reading and the previously displayed temperature reading is displayed (box 412), as there may be engine heat interference with the temperature sensor at ignition.

It should be understood that the time thresholds can be fixed and/or variable values. Furthermore, the engine control system 42 and/or control unit 60 can store such values for the thresholds and/or can calculate such values.

Continuing in accordance with principles of the present disclosure, multiple, successive relatively short ignition-on times can be taken into account when displaying an external temperature. For example, the stored time amount is not reset when the previous ignition-on time is relatively small, such as one minute, as an example, and the sum of the current ignition-off time and the stored time amount falls below the third time threshold $X_4$. Furthermore, the previous ignition-off time is added to the stored time amount in such a situation. Therefore, the stored time amount includes all of the ignition-off times between successive relatively short ignition-on times.

It should be understood that this method of controlling an initial external temperature display according to the principles of the present disclosure can vary. Accordingly, it should be understood that the description herein of this method is exemplary in nature.

Figure 5:
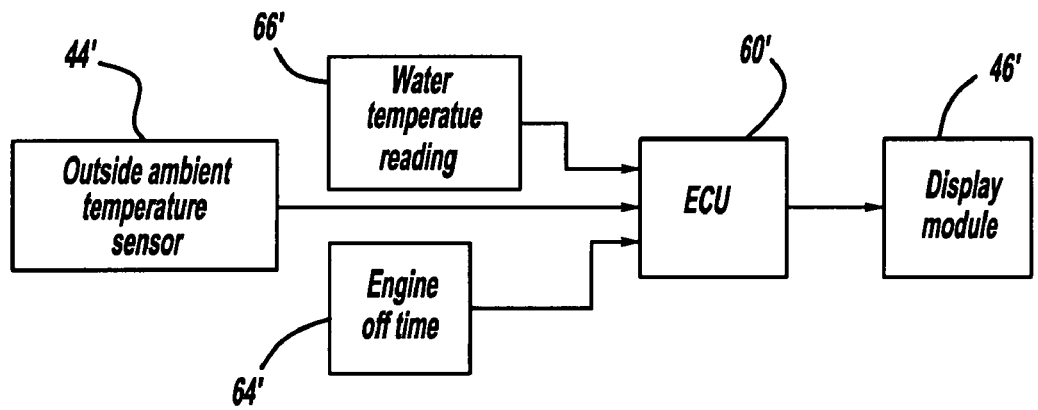
FIG. 5 is an diagram depicting another exemplary external temperature display system according to the present disclosure.

Referring to FIG. 5, another system for controlling an initial external temperature display of a vehicle 20 is schematically depicted. The temperature sensor 44' communicates with a control unit 60', which in turn communicates with the display module 46'. Furthermore, control unit 60' can receive information regarding the amount of time the ignition of the vehicle 20 has been off (ignition off time 64') and the temperature of the engine water (engine water temperature 66'). It should be understood that it is known to detect, store, and transmit engine water temperature (e.g. from an engine cooling system). Accordingly, this feature will not be described in further detail herein.

Another exemplary method of controlling an initial external temperature display according to the principles of the present disclosure includes consideration of the engine water temperature of the vehicle. In particular, when the vehicle has not been off long enough to ensure against engine heat interference with the temperature sensor at ignition, the engine water temperature of the vehicle is considered. When the engine water temperature is cool enough, such as at the ambient air temperature, or a few degrees Fahrenheit from the ambient air temperature, the vehicle engine should be cool enough so as to not interfere with the temperature sensor, and the current temperature reading is displayed.

Figure 6:
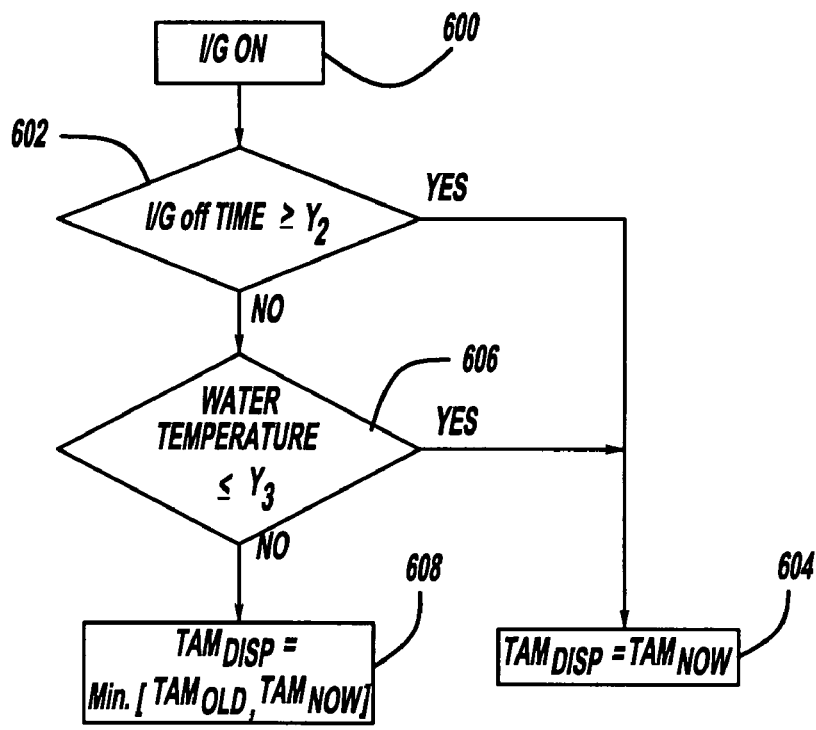
FIG. 6 is a flowchart of another exemplary method of controlling an initial external temperature display in a vehicle according to the present disclosure.

Referring to FIG. 6, a flowchart illustrates such method of controlling an initial external temperature display in a vehicle in greater detail. As in FIG. 4, "I/G" represents the ignition of a vehicle 20, "$TAM_{DISP}$" represents the temperature reading which will be displayed by display module 46', "$TAM_{NOW}$" represents the current temperature reading from temperature sensor 44', and "$TAM_{OLD}$" represents the temperature reading displayed at the end of the previous ignition cycle (the previously displayed temperature reading).

The method of controlling an initial external temperature display in a vehicle according to the principles of the present disclosure of FIG. 6 begins at box 600 when the ignition of vehicle 20 is turned on. Referring to decision box 602, first the ignition-off time (I/G off TIME) is compared to a time threshold $Y_2$. When the ignition-off time equals or exceeds the time threshold $Y_2$, the current temperature reading ($TAM_{NOW}$) is displayed (box 604). By way of a non-limiting example, as in the previously described method, the time threshold $Y_2$ can be 60 minutes.

With continued reference to FIG. 6, when the ignition-off time falls below time threshold $Y_2$, the engine water temperature is compared to a temperature threshold $Y_3$ (decision box 606). For example, with time threshold $Y_2$ at 60 minutes, when vehicle 20 has been off for less than 60 minutes, there may be engine heat interference with the temperature sensor 44' at ignition, so the engine water temperature is checked. When the engine water temperature exceeds the temperature threshold $Y_3$, the minimum of the current temperature reading ($TAM_{NOW}$) and the previously displayed temperature reading ($TAM_{OLD}$) is displayed (box 608), as there may be engine heat interference. When the engine water temperature equals or becomes less than the temperature threshold $Y_3$, the current temperature reading is displayed (box 604), as the engine should be cool enough so as to not interfere with the temperature sensor 44' at ignition.

It should be understood that the time and temperature thresholds can be fixed and/or variable values. For example, the control unit 60' can receive such values for the thresholds and/or can calculate such values.

It should be understood that this method of controlling an initial external temperature display according to the principles of the present disclosure can vary. Accordingly, it should be understood that the description herein of this method is exemplary in nature.

Moreover, it should be understood that the present disclosure can vary in many ways. For example, the principles of the present disclosure can be used with a variety of vehicles. Furthermore, in another example, the components of a system for controlling an initial external temperature display can vary according to the principles of the present disclosure and can have a variety of configurations according to the principles of the present disclosure.

Additionally, the methods of controlling an initial external temperature display in a vehicle according to the principles of the present disclosure can vary. In particular, it should be understood that the methods of controlling an initial external temperature display in a vehicle described herein can include additional features to check and account for whether the temperature sensor is working properly, whether the information (e.g. ignition-off time) is available and valid, and whether the vehicle battery has been connected for the first time. For example, if it is determined that the temperature sensor is not working properly, a default value can be displayed. Accordingly, it should be understood that the present disclosure is exemplary in nature.

What is claimed is:

1. A method of controlling an initial external temperature display in a vehicle, the method comprising:
    comparing an ignition-off time with a first ignition-off time threshold;
    displaying a current temperature reading from an outside ambient temperature sensor when said ignition-off time one of equals and exceeds said first ignition-off time threshold;
    comparing at least one secondary condition with at least one secondary control parameter when said ignition-off time is less than said first ignition-off time threshold; and
    selecting and displaying a temperature reading based on the comparison of said at least one secondary condition with said at least one secondary control parameter, wherein comparing at least one secondary condition with at least one secondary control parameter further comprises:
    comparing a sum of said ignition-off time and a stored time amount with a third time threshold when a previous ignition-on time is equal to or falls below a first ignition-on time threshold.

2. The method of claim 1, wherein comparing at least one secondary condition with at least one secondary control parameter further comprises:
    comparing a previous ignition-on time with said first ignition-on time threshold.

3. The method of claim 2, wherein selecting and displaying a temperature reading based on the comparison of said at least one secondary condition with said at least one secondary control parameter includes:
    determining a minimum temperature reading between said current temperature reading and a previously displayed temperature reading and displaying said minimum temperature reading when said previous ignition-on time exceeds said first ignition-on time threshold.

4. The method of claim 1, wherein comparing at least one secondary condition with at least one secondary control parameter includes:
    comparing an engine water temperature with a temperature threshold.

5. The method of claim 4, wherein selecting and displaying a temperature reading based on the comparison of said at least one secondary condition with said at least one secondary control parameter includes:
    displaying said current temperature reading when said engine water temperature one of equals and falls below said temperature threshold.

6. The method of claim 5, wherein selecting and displaying a temperature reading based on the comparison of said at least one secondary condition with said at least one secondary control parameter further includes:
    determining a minimum temperature reading between said current temperature reading and a previously displayed temperature reading and displaying said minimum temperature reading when said engine water temperature exceeds said temperature threshold.

7. A method of controlling an initial external temperature display in a vehicle, the method comprising:
    comparing an ignition-off time with a first ignition-off time threshold;
    displaying a current temperature reading from an outside ambient temperature sensor when said ignition-off time one of equals and exceeds said first ignition-off time threshold;
    comparing at least one secondary condition with at least one secondary control parameter when said ignition-off time falls below said first ignition-off time threshold and comparing a previous ignition-on time with a first ignition-on time threshold; and selecting and displaying a temperature reading based on the comparison of said at least one secondary condition with said at least one secondary control parameter, wherein comparing at least one secondary condition with at least one secondary control parameter further includes:

comparing a sum of said ignition-off time and a stored time amount with a third time threshold when said previous ignition-on time one of equals and falls below said first ignition-on time threshold.

8. The method of claim 7, wherein selecting and displaying a temperature reading based on the comparison of said at least one secondary condition with said at least one secondary control parameter includes:

displaying said current temperature reading when said sum one of equals and exceeds said third time threshold.

9. The method of claim 8, wherein selecting and displaying a temperature reading based on the comparison of said at least one secondary condition with said at least one secondary control parameter further includes:

determining a minimum temperature reading between said current temperature reading and a previously displayed temperature reading and displaying said minimum temperature reading when said sum falls below said third time threshold.

10. A method of controlling an initial external temperature display in a vehicle, the method comprising:

comparing a current ignition-off time with a first ignition-off time threshold;

displaying a current temperature reading from an outside ambient temperature sensor when said current ignition-off time one of equals and exceeds said first ignition-off time threshold;

comparing a previous ignition-on time with a first ignition-on time threshold when said current ignition-off time falls below said first ignition-off time threshold;

selecting and displaying a temperature reading when said previous ignition-on time exceeds said first ignition-on time threshold;

comparing a sum of said first ignition-off time and a stored time amount with a third time threshold when said previous ignition-on time one of equals and falls below said first ignition-on time threshold; and selecting and displaying a temperature reading based on the comparison of said sum with said third time threshold.

11. The method of claim 10, wherein selecting and displaying a temperature reading based on the comparison of said sum with said third time threshold includes:

displaying said current temperature reading when said sum one of equals and exceeds said third time threshold.

12. The method of claim 11, wherein selecting and displaying a temperature reading based on the comparison of said sum with said third time threshold further includes:

determining a minimum temperature reading between said current temperature reading and a previously displayed temperature reading and displaying said minimum temperature reading when said sum falls below said third time threshold.

13. The method of claim 12, further comprising resetting said stored time amount when said sum one of equals and exceeds said third time threshold.

14. The method of claim 10, wherein selecting and displaying a temperature reading when said previous ignition-on time exceeds said first ignition-on time threshold includes:

determining a minimum temperature reading between said current temperature reading and a previously displayed temperature reading and displaying said minimum temperature reading.

15. The method of claim 14, further comprising resetting said stored time amount when said previous ignition-on time exceeds said first ignition-on time threshold.

16. The method of claim 10, further comprising resetting said stored time amount when said current ignition-off time one of equals and exceeds said first ignition-off time threshold.

17. The method of claim 10, further comprising adding a previous ignition-off time to said stored time amount when said previous ignition-on time one of equals and falls below said first ignition-on time threshold and before comparing said sum with said third time threshold.

* * * * *

UNITED STATES PATENT AND TRADEMARK OFFICE
CERTIFICATE OF CORRECTION

PATENT NO. : 7,668,686 B2  
APPLICATION NO. : 11/703808  
DATED : February 23, 2010  
INVENTOR(S) : Joshua Conte et al.

Page 1 of 1

It is certified that error appears in the above-identified patent and that said Letters Patent is hereby corrected as shown below:

Title Page, item [75] Inventors: "Robert Wunsche" should be
--Robert Wunsche, III--

Signed and Sealed this

Twenty-seventh Day of April, 2010

David J. Kappos  
*Director of the United States Patent and Trademark Office*